United States Patent

Walder et al.

[11] Patent Number: 5,882,490
[45] Date of Patent: Mar. 16, 1999

[54] WIRE ELECTRODE ARRANGEMENT FOR ELECTROEROSIVE CUTTING

[75] Inventors: Georg Walder, Vernier; Francois Balleys, Satigny, both of Switzerland

[73] Assignee: Charmilles Technologies S.A., Switzerland

[21] Appl. No.: 844,746

[22] Filed: Apr. 22, 1997

[51] Int. Cl.[6] ................................................. C25B 11/00

[52] U.S. Cl. ........................................ 204/280; 204/290 R

[58] Field of Search ................................. 204/225, 280, 204/206, 290 R, 288; 219/69.12

[56] References Cited

U.S. PATENT DOCUMENTS

| | | | |
|---|---|---|---|
| 4,263,116 | 4/1981 | Inoue | 204/225 |
| 5,140,125 | 8/1992 | Groos | 219/69.12 |

Primary Examiner—Kathryn Gorgos
Assistant Examiner—Thomas H. Parsons
Attorney, Agent, or Firm—Gifford, Krass, Groh, Sprinkle, Anderson & Citkowski, P.C.

[57] ABSTRACT

A wire electrode arrangement for electroerosion cutting includes an elongated core. Multiple electrode elements are arranged sequentially along the elongated core. The electrode elements are separated by gaps and are mutually insulated.

8 Claims, 3 Drawing Sheets

WIRE ELECTRODE ARRANGEMENT FOR ELECTROEROSIVE CUTTING

FIELD OF THE INVENION

BACKGROUND OF THE INVENTION

The invention pertains to a wire electrode arrangement for electroerosive cutting and a method for implementing said arrangement. The method of electroerosive cutting utilizes the effect of a potential difference between the electrode and a conductive workpiece to be processed. This potential difference causes spark discharges that, in turn, lead to the removal of material from the workpiece to be processed. Such methods are known from the state of the art.

In conventional methods for cutting by means of electrical discharge machining, the electrode consists of only one wire which is conductive throughout its cross section. The cutting speed is limited by the number of discharges per time unit and the energy of each discharge (i.e., the maximum current density) because local overheating of the wire can lead to wire breakage.

Various patents, e.g., U.S. Pat. No. 5,196,665 or U.S. Pat. No. 4,740,666, describe methods in which the electrically conductive core of a wire which consists of an alloy is coated with one or more layers of different materials. These materials preferably consist of metals with low melting and evaporating temperatures and superior electrical conductivity, e.g., zinc. Consequently, it is possible to attain a wire core with high tensile strength which is additionally protected from possible wire breakage by the coating that acts as a heat shield. Such a wire electrode makes it possible to operate with high current densities and consequently increase the machining speed. According to F. Dauw (ISEM-X) these measures made it possible to double the cutting speed (between 1986 and 1990). However, an additional increase in the cutting speed can hardly be attained by exclusively utilizing one of the above-mentioned methods.

Another method for increasing the machining speed which is known from the field of electroerosive cavity sinking simultaneously utilizes several electrodes. Consequently, it is possible for discharges to occur at different positions per time unit. The utilization of several electrodes for electroerosive cutting was described in EP 0,433,747. However, the objective of this publication pertains to the cutting of nonconductive materials. In this case, the cathode as well as the anode are situated on a wire-shaped arrangement such that discharges occur between the electrodes of the wire arrangement, but not between the wire arrangement and the workpiece. Consequently, the geometry of this arrangement is not suitable for the desired type of machining, i.e., several simultaneous discharges are not possible.

SUMMARY OF THE INVENTION

The present invention is based on the objective of developing a simply designed wire electrode arrangement for electroerosive cutting as well as an easily applicable method for implementing said arrangement which makes it possible to increase the cutting speed.

With respect to the wire electrode arrangement, this objective is attained by utilizing at least one first electrode that is insulated from an additional electrode, with each electrode being connected to an independent current and voltage source. An appropriate control unit monitors the discharges on each electrode and controls the advance of the wire electrode arrangement. The wire electrode may consist of at least two stretched, essentially parallel wires that are mutually insulated and twisted. According to another solution, an arrangement of conductive layer elements that are mutually insulated is applied onto a nonconductive wire core (or a wire core that is coated with a nonconductive material).

The arrangement according to the invention provides a number of significant advantages. Since several electrodes are arranged on one wire arrangement, several discharges can simultaneously occur, in particular when machining workpieces with larger thicknesses, i.e., the cutting speed is correspondingly increased.

The invention provides the additional advantage that only one wire arrangement is used. Several electrodes are arranged on this wire arrangement. Consequently, complicated guiding devices can be eliminated, i.e., this wire arrangement can essentially be used in known EDM machines that comprise several current sources and a corresponding control. However, a machine modified in this fashion can also be easily operated with conventional wires.

An additional advantage of the invention can be seen in the uneven surface of the wire arrangement. The helical shape as well as the interruptions of individual elements provide the advantage that particles are transported away from the cutting gap, i.e., uncontaminated dielectric is always able to flow into the region in which the cutting process is carried out. This leads to an increase in the cutting speed, in particular when working with very narrow machining gaps. In addition, the heat transfer between the wire and the dielectric is increased such that the risk of wire breakage is reduced.

According to the invention, it is advantageous that the discharge currents can be reduced as compared to a conventional wire while working at the same cutting speed. In addition, the capacitances of the individual wire segments are reduced. Both of these advantages result in a superior surface quality of the workpiece.

The principle according to the invention allows numerous embodiments of the wire electrode arrangement. According to a first embodiment, it is proposed that a conductive cover layer is applied onto a nonconductive wire core that, for example, consists of a silicate, e.g., glass. This cover layer is interrupted at regular intervals, i.e., the conductive cover layer elements are arranged in a row similar to chain links. According to one embodiment of this principle, the core consists of a conductive wire that is entirely covered by an insulating layer onto which the conductive elements are subsequently applied. The power supply for the individual elements is realized with the aid of sliding contacts arranged above or underneath the workpiece to be processed. In this case, the distance between the contacts approximately corresponds to the length of the individual elements. This measure ensures that two mutually insulated elements are, with the exception of short sections of the movement, always in electric contact and situated within the working area between the contacts during the unwinding of the wire.

Alternatively to the above-mentioned principle, it may be practical to realize the wire electrode arrangement in the form of at least two stretched wires that are arranged essentially parallel to one another as well as mutually insulated and twisted. In order to prevent a short circuit between the electrodes of the wire that is usually wound onto a drum, all but one electrode must be entirely covered with an insulating enamel layer that is subsequently removed within the vicinity of the outer contacts. In this case, it is possible to utilize particularly economical enamel-covered wires of copper or other alloys. A subsequently arranged scraping nozzle makes it possible to remove the insulating enamel layer from certain circumferential regions in targeted fashion in order to realize the desired discharge regions. In this case, the individual wire electrodes are either directly bonded or welded together at their insulating layer or are connected by means of an additional insulating layer. The individual wires are connected to the respective current and voltage sources by means of sliding contacts. The electrodes are subsequently twisted by a suitable guide during the unwinding of the wire. In this case, it is necessary to distinguish between a rigid upper guide and a rotatably seated lower guide. The rigid guide prevents the twisting of the band or multiple wire within the region of the sliding contacts. The rotatably seated guide allows an adaptation of the twisting to a different working height, e.g., when machining greater workpiece thicknesses.

Alternatively to the previously described embodiments, it may be particularly practical if the wire electrode arrangement consists of a band-shaped insulator. Several strip-shaped electrodes are separately applied onto one of the outer surfaces of the band. During the unwinding process, the band is twisted such that the strip-shaped electrodes of the resulting helical arrangement are directed outward.

The invention makes it possible to manufacture a wire-shaped electrode arrangement that allows the simultaneous machining of a workpiece by several electrodes. Consequently, the cutting speed is increased in comparison to conventional single-electrode wires or the surface quality can be improved when working at the same cutting speed as that of a conventional single-electrode wire.

Embodiments of the invention are described below with reference to the figures.

Detailed Description Of The Preferred Embodiment

Figure 1:
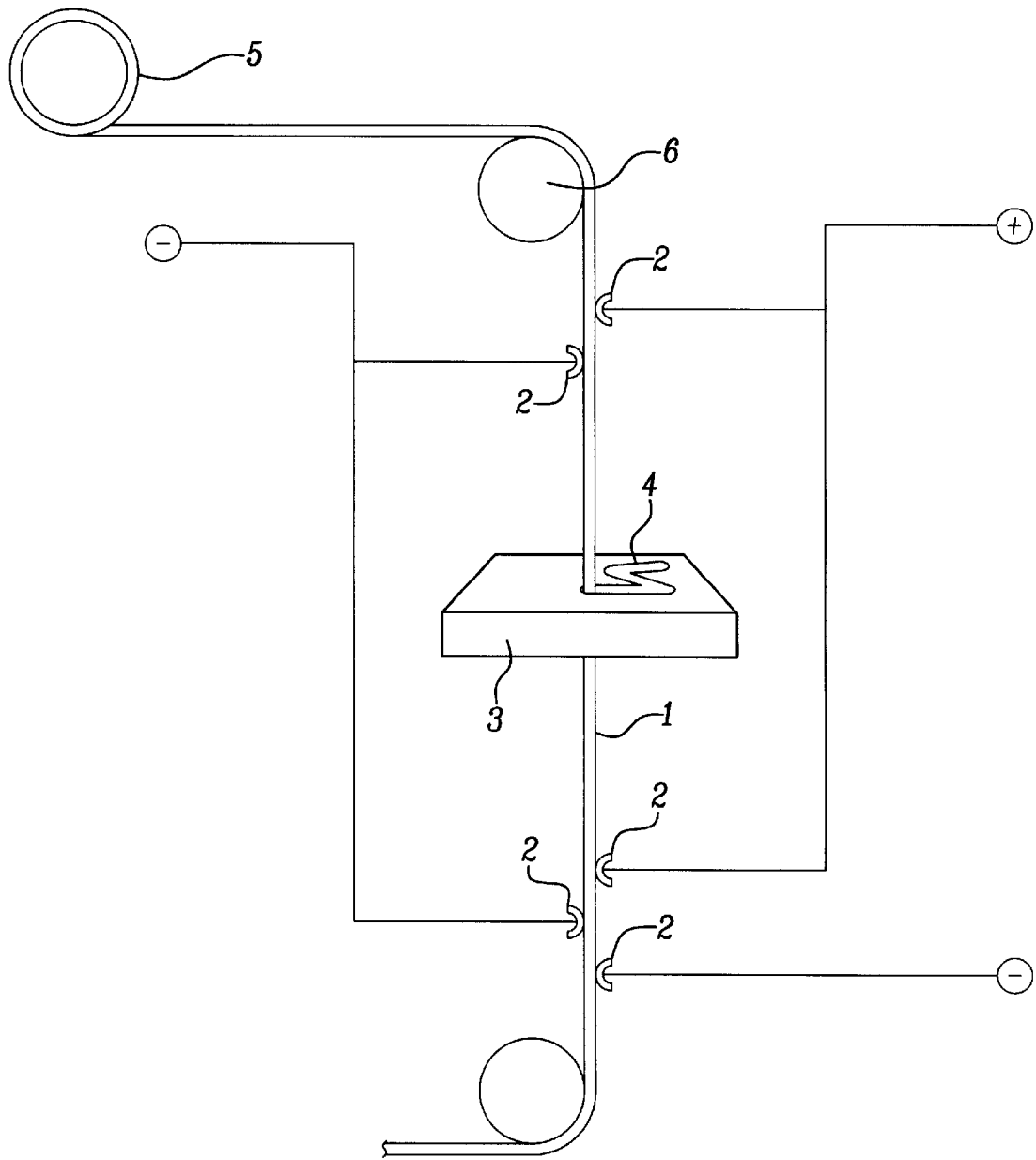
FIG. 1 is a schematic representation of an arrangement for cutting by means of electrical discharge machining.

FIG. 1 shows a schematic representation of the EDM arrangement according to the invention. This arrangement comprises a workpiece 3 of a conductive material, into which a cut 4 is machined. At least within the region of the cutting zone, the entire arrangement is situated in a dielectric in accordance with the state of the art. The wire electrode 1 is unwound from a supply roll 5 and guided through the workpiece by means of deflection rollers 6. According to the state of the art, the workpiece is usually at ground potential. The sliding contacts 2 serve for producing a connection to a source at positive or negative potential.

Figure 2:
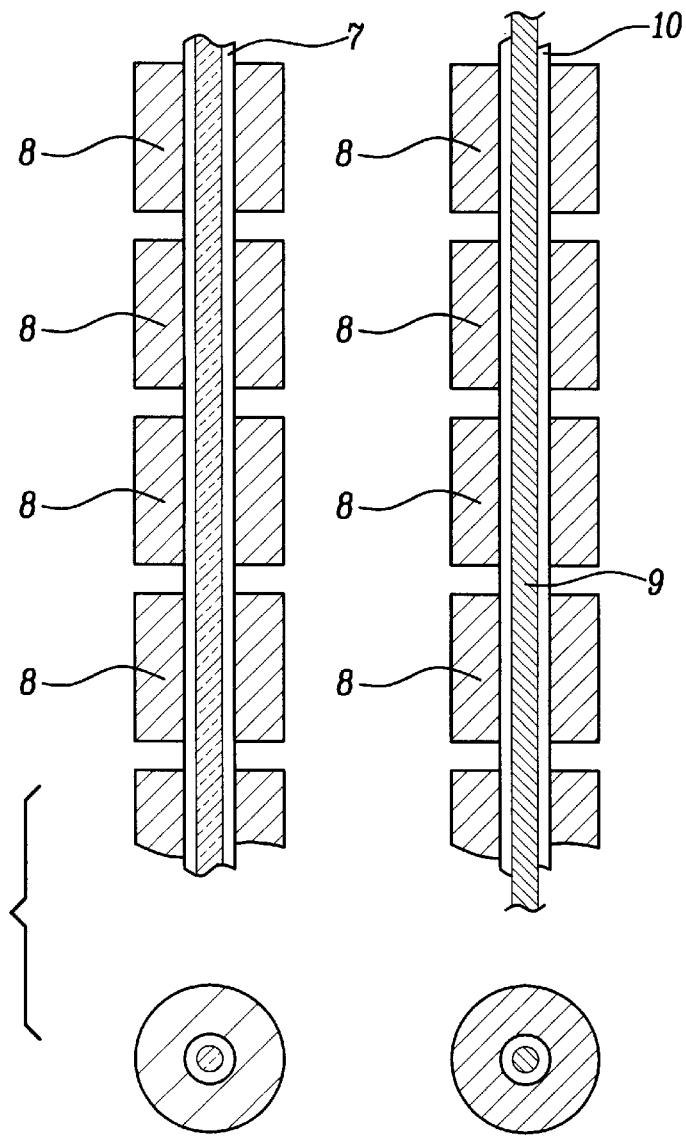
FIG. 2 is a schematic (perspective) view of a first embodiment of the arrangement according to the invention, namely in the form of a wire similar to chain links.

FIG. 2 shows an enlarged view of a first embodiment of a wire electrode according to the invention. In this case, the wire electrode is realized in the form of a string similar to chain links. The left half of this figure shows an arrangement in which elements of an electrically conductive material 8 that are mutually insulated by gaps are applied onto a nonconductive core 7 consisting, for example, of quartz glass or plastic. The right half of this figure shows an arrangement in which an insulating layer 10 is applied onto a conductive core 9, for example, a conventional wire. The elements consisting of an electrically conductive material and mutually insulated by gaps are applied onto this layer. The cross section of the respective arrangements is shown on the right and left side at the bottom of this figure.

Figure 3:
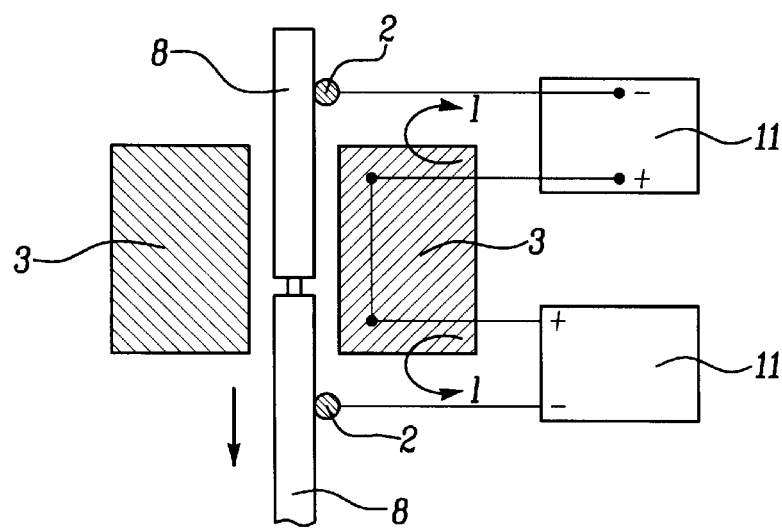
FIG. 3 is a schematic representation of the arrangement that employs several electrodes.

FIG. 3 shows a schematic representation of the arrangement that employs several electrodes. The workpiece 3 is connected to the ground potential of two generators 11. The minus potential of each generator is respectively connected to one of the electrode elements 8 by means of sliding contacts 2. Consequently, two discharges between the workpiece and the wire electrode arrangement can simultaneously occur within the cutting region.

Figure 4:
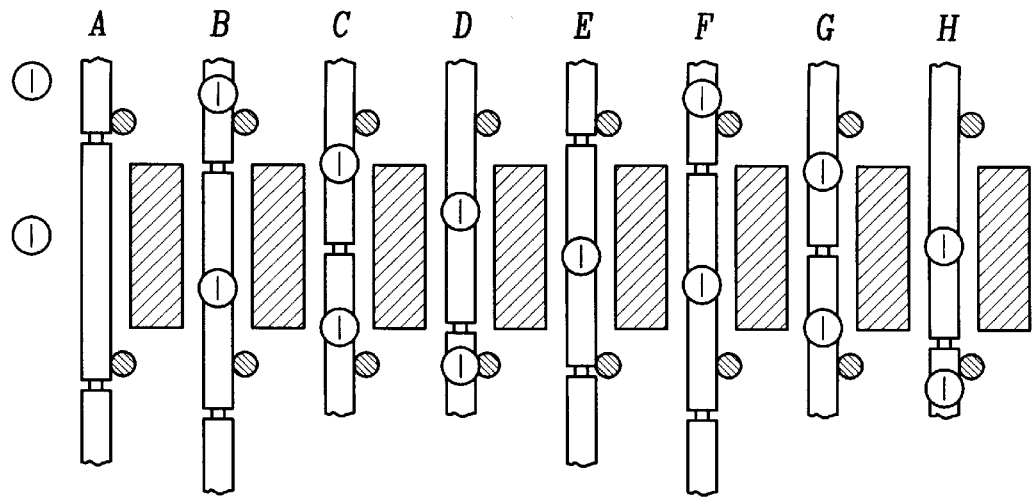
FIG. 4 is a representation of the operating sequence of the arrangement according to FIG. 3.

FIG. 4 shows the operating sequence of the arrangement according to FIG. 3. The downward directed movement of the wire causes different large sections of the electrode elements which are connected via the upper or lower sliding contacts to be situated within the cutting region at different times. In the extreme instance A, only one element is situated within this region.

Figure 5:
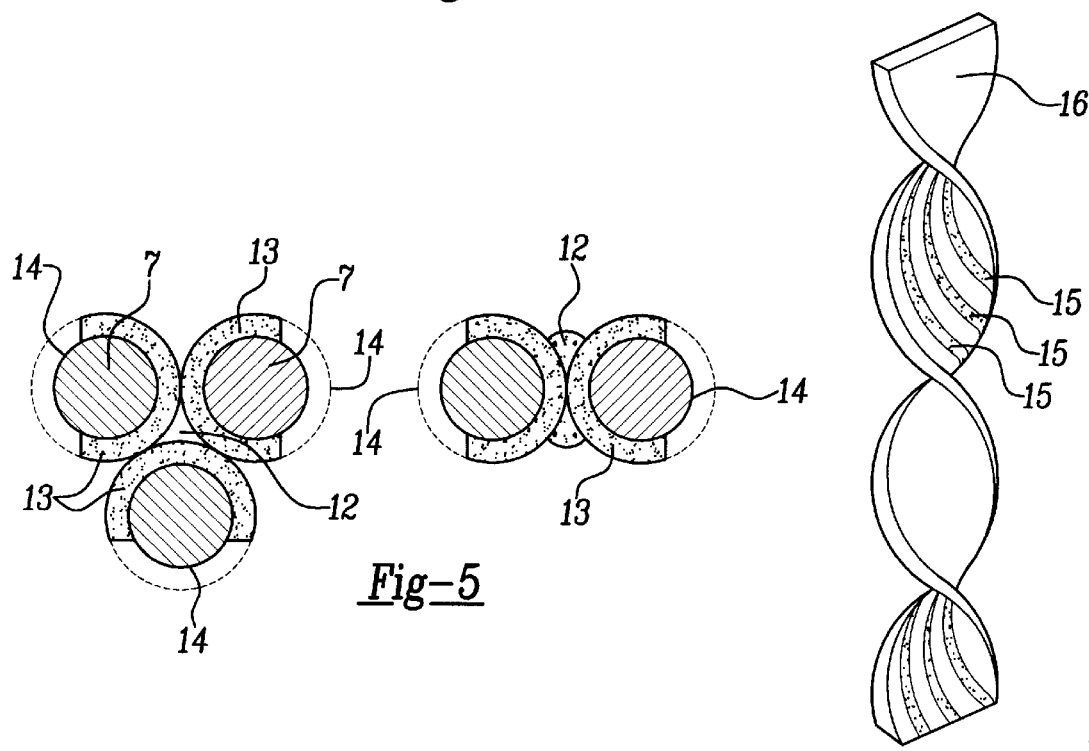
FIG. 5 shows two schematic views of additional embodiments in the form of several wires that are connected together.

FIG. 5 shows enlarged views of additional embodiments of a wire electrode according to the invention. These embodiments comprise at least two electrodes that respectively consist of a conductive wire core 7 which is provided with an insulating layer 13. The wires are connected together at their insulating layer, e.g., by means of a bonding agent 12. When using two wires as shown in the right half of the figure, one attains a double wire system with a cross section similar to a figure eight. When using three wires as shown in the left half of the figure, one attains a cross section similar to a cloverleaf. The insulating layer 13 was removed within certain circumferential regions 14 by means of a scraping nozzle (not shown) so as to attain the desired discharge regions. These discharge regions are usually situated in positions that have a maximum distance from the entire arrangement; when using two wires, this corresponds to that side of the wire which respectively opposes the connecting point.

Figure 6:
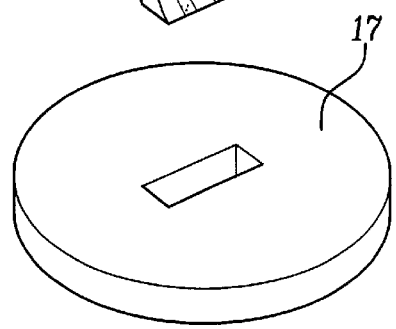
FIG. 6 is a schematic, perspective view of an embodiment in the form of a twisted band coated with conductive strips.

FIG. 6 shows a schematic, perspective view of an embodiment according to FIG. 5 in the form of a twisted band 16 that is coated with conductive strips 15. During the unwinding of the band from a roll, the electric potential from different generators is transmitted to the respective strip electrodes by sliding contacts that are arranged in accordance with the electrode configuration. A rigid upper guide for the band prevents the twisting of the band within the region of the sliding contacts. A rotatable support of the guide 17 is preferred for the lower band guide in order to adapt the twisting to different working heights.

The invention is not limited to the embodiments shown. The scope of the invention includes numerous modifications and variations of the previously described principle.

We claim:

1. A wire electrode arrangement for electroerosion cutting, said arrangement comprising:
   a first and a second electrode insulated from each other, said electrodes forming a wire-shape;
   said wire electrode arrangement being formed by segments that are formed similar to chain links and mutually insulated; wherein a core of said wire electrode arrangement comprises a nonconductive material.

2. The wire electrode arrangement according to claim 1, wherein the segments consist of a conductive material.

3. The wire electrode arrangement according to claim 1, wherein a core of said wire electrode arrangement comprises a conductive material that is coated with said nonconductive insulating layer.

4. The wire electrode arrangement according to claim 1, further comprising a first and a second sliding contact, said contacts being connected to different current and voltage sources.

5. The wire electrode arrangement according to claim 4, wherein a distance between the sliding contacts approximately corresponds to a length of the segments.

6. A wire electrode arrangement for electroerosion cutting, said arrangement comprising:

an elongated core;

a plurality of electrode elements arranged sequentially along said elongated core, said electrode elements being separated by gaps and being mutually insulated; said core comprises a non conductive material.

7. The wire electrode arrangement according to claim 6, wherein said core comprises a conductive material coated with said nonconductive insulating layer.

8. A wire electrode arrangement for electroerosion cutting, said arrangement comprising:

a core comprising a nonconductive material; and a plurality of mutually insulated electrode elements arranged on said core.

* * * * *

UNITED STATES PATENT AND TRADEMARK OFFICE
CERTIFICATE OF CORRECTION

PATENT NO. : 5,882,490

DATED : March 16, 1999

INVENTOR(S) : Georg Walder et al.

It is certified that error appears in the above-identified patent and that said Letters Patent is hereby corrected as shown below:

Column 1, lines 7-9 - Move the first sentence which reads, "The invention pertains . . . said arrangements." to directly under the heading "FIELD OF THE INVENTION".

Column 5, line 6 - Replace "insulating layer" with --material--.

Signed and Sealed this

Second Day of November, 1999

Attest:

Q. TODD DICKINSON

*Attesting Officer*  Acting Commissioner of Patents and Trademarks